US008784527B2

(12) United States Patent
Jung

(10) Patent No.: US 8,784,527 B2
(45) Date of Patent: Jul. 22, 2014

(54) AIR CLEANER FOR VEHICLE

(75) Inventor: Doo Seok Jung, Gyeonggi-do (KR)

(73) Assignee: Kia Motors Corporation, Seoul (KR)

( * ) Notice: Subject to any disclaimer, the term of this patent is extended or adjusted under 35 U.S.C. 154(b) by 46 days.

(21) Appl. No.: 13/449,999

(22) Filed: Apr. 18, 2012

(65) Prior Publication Data

US 2013/0139483 A1 Jun. 6, 2013

(30) Foreign Application Priority Data

Dec. 2, 2011 (KR) ........................ 10-2011-0128323

(51) Int. Cl.
*B01D 45/00* (2006.01)

(52) U.S. Cl.
USPC ................ 55/480; 55/385.3; 55/481; 55/497; 55/511; 55/521; 123/198 E

(58) Field of Classification Search
USPC ................ 55/385.3, 497, 511, 521, 480–482; 123/198 E
See application file for complete search history.

(56) References Cited

U.S. PATENT DOCUMENTS

| | | | | |
|---|---|---|---|---|
| 2008/0110146 | A1 | 5/2008 | Germain et al. | |
| 2011/0308210 | A1 * | 12/2011 | Crabtree et al. | 55/483 |

FOREIGN PATENT DOCUMENTS

| | | | |
|---|---|---|---|
| JP | 6-1764 | U | 1/1994 |
| KR | 2001-0067987 | A | 7/2001 |
| KR | 10-2004-0102585 | A | 12/2004 |
| KR | 10-2007-0060564 | A | 6/2007 |
| KR | 10-2008-0049814 | A | 6/2008 |

* cited by examiner

*Primary Examiner* — Robert Clemente
*Assistant Examiner* — Karla Hawkins
(74) *Attorney, Agent, or Firm* — Morgan, Lewis & Bockius LLP

(57) ABSTRACT

An air cleaner apparatus for a vehicle may include a filter assembly a case that accommodates the filter assembly therein, a door rotatably installed on the case to open/close the case, and a link unit having both end portions rotatably installed on the inside of the case and the door respectively, for making the filter assembly adhere closely to or release from the case while interlocking with the rotating door.

4 Claims, 5 Drawing Sheets

<Related Art>

<Related Art>

AIR CLEANER FOR VEHICLE

CROSS-REFERENCE TO RELATED APPLICATION

The present application claims priority to Korean Patent Application No. 10-2011-0128323, filed on Dec. 2, 2011 in the Korean Intellectual Property Office, the entire contents of which is incorporated herein for all purposes by this reference.

BACKGROUND OF THE INVENTION

1. Field of the invention

The present invention relates to an air cleaner for a vehicle, and more particularly, to an air cleaner for a vehicle, which makes it possible to easily replace a filter of the air cleaner and secures strong airtightness of the filter.

2. Description of Related Art

In general, an air cleaner provided in an engine room of a vehicle purifies intake air that is necessary in a combustion process of an engine to obtain high output of the engine.

An air cleaner in the related art, as disclosed in Korean Unexamined Patent Publication No. 10-2005-0104070 entitled "Gasket Assembly Structure of Air Cleaner Filter", published on Dec. 2, 2005, 2-3 p, FIG. 4, includes a case and a cover, and a filter is installed in an inner space that is formed through engagement of the case with the cover. On the case of the air cleaner, an air inlet for making air flow into the case and an outlet for exhausting the inflow air from the case are formed.

Accordingly, outer air flows into the inside of the air cleaner 1 through an intake duct that is connected to the air inlet of the air cleaner, and the inflow air passes through the filter of the air cleaner, which filters foreign substances such as dust, to be supplied to the engine.

However, according to the above-described air cleaner in the related art, due to the design-related cause of the currently developed vehicles, a front pillar (A-Pillar) is formed long (deep) to the inside of the engine room in the front portion of the vehicle, and thus a cowl is also installed in the deep interior of the engine room. Further, a brake reserve tank is arranged on the front side of the engine room to keep away from the cowl and is positioned at an upper end portion of the air cleaner.

Accordingly, as illustrated in FIG. 1, due to a narrow gap between the air cleaner 1 and peripheral components, it is not easy to rotate (open) the cover 3 from the case 2 that forms the air cleaner 1, and this causes inconvenience and trouble in replacing the filter of the air cleaner 1.

That is, in order to replace the filter of the air cleaner 1 in the related art as illustrated in FIG. 2, a clamp 3*a* is removed, the cover 3 is opened from the case 2 through the rotation thereof, and then a filter assembly 4 is extracted from the case 2. However, as described above, due to the narrow layout of the engine room, the opening and closing structure of the air cleaner 1, and the characteristic of the intake duct that is connected to the air cleaner 1 (in the case of the duct having a short length or the hose having no flexibility), the filter replacement is hampered by a lot of obstacles.

In particular, if a sufficient space between the open cover 3 and the case 2 is not secured, a rubber gasket 5 that is installed on the filter assembly 4 may be pressed (chewed) between the cover 3 and the case 2 during the replacement of the filter, and this may cause the airtightness of the filter to deteriorate.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an air cleaner for a vehicle, which makes it possible to easily replace a filter assembly of the air cleaner without being interfered by peripheral components provided in an engine room and secures strong airtightness of the filter assembly.

In one aspect of the present invention, the air cleaner apparatus for a vehicle, may include a filter assembly, a case that accommodates the filter assembly therein, a door rotatably installed on the case to open/close the case, and a link unit having both end portions rotatably installed on the inside of the case and the door respectively, for making the filter assembly adhere closely to or release from the case while interlocking with the rotating door.

The link unit may include a vertical link having one end portion that is rotatably coupled to the inside of the case, and a horizontal link having both end portions that are rotatably coupled on the other end portion of the vertical link and the door to make the filter assembly adhere closely to an inner surface of the case when the door is closed.

The horizontal link pushes the filter assembly upwards in the case when the door is closed while the vertical link rotates in the same direction as the door.

The filter assembly may include a filter frame accommodating a filter therein, a coupling projection formed to project from an outer surface of the filter frame, and a gasket installed to surround the coupling projection to be selectively in contact with the inner surface of the case and the horizontal link.

The horizontal and vertical links are installed on one side of the case, and an extension portion to which the gasket of the filter assembly adheres closely is provided on the inner surface of the case.

there is provided an air cleaner for a vehicle having a case that accommodates a filter assembly therein, which includes a door rotatably installed on the case to open/close the case; and a link means, having both end portions rotatably installed on the inside of the case and the door, for making the filter assembly adhere closely to or release from the case while interlocking with the rotating door.

The link means may include a vertical link having one end portion that is rotatably installed in the inside of the case; and a horizontal link having both end portions that are rotatably installed on the vertical link and the door to make the filter assembly adhere closely to an inner surface of the case when the door is closed.

Further, the filter assembly may include a filter frame accommodating the filter; a coupling projection formed to project from an outer surface of the filter frame; and a gasket installed to surround the coupling projection to be in contact with the inner surface of the case and the horizontal link. The horizontal and vertical links may be installed on one side of the case, and an extension portion to which the gasket of the filter assembly adheres closely may be provided on the inner surface of the case.

The air cleaner for a vehicle according to the present invention has the following effects.

First, since the filter replacement work of the air cleaner can be easily done, the repair performance and workability are improved.

In comparison to the air cleaner in the related art, in which the intake duct is connected to the air cleaner and it is not easy to open the cover due to the interference with the peripheral components in the engine room, the air cleaner according to the present invention facilitates the replacement work since the filter is replaced after the filter assembly is extracted in a sliding manner in a state where the door of the air cleaner is opened regardless of the peripheral components.

Second, the space around the air cleaner and the engine room layout setting can be efficiently used.

According to the present invention, since the filter is replaced through opening of the compact door rotatably installed on the case and extraction of the filter assembly in a sliding manner from the case through the open door, it is not required to fully open the case as in the related art, and thus the space around the air cleaner and the engine room layout setting can be efficiently used.

Third, the merchantability and customer satisfaction can be improved according to the improvement of the repair performance.

As described above, since the replacement work of the air cleaner is conveniently done, a driver can directly repair the filter without the necessity of visiting a repair shop, and thus the repair cost can be saved with the improvement of the customer satisfaction and merchantability.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
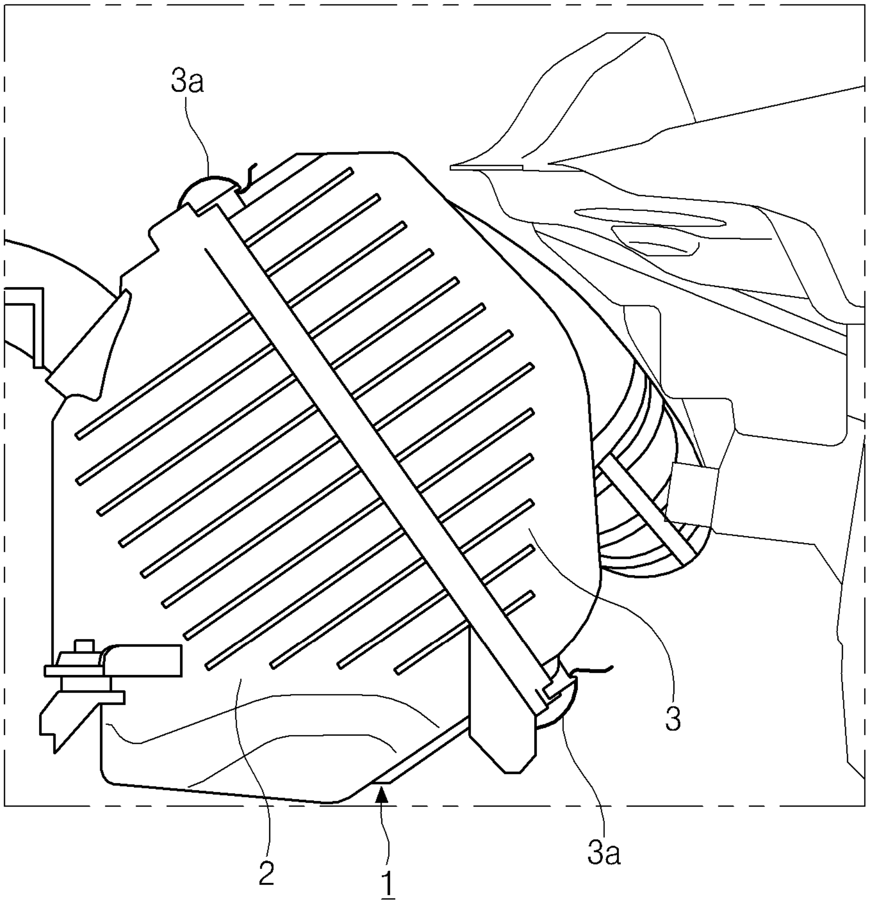
FIG. 1 is a view illustrating an installation state of a general air cleaner.
Figure 2:
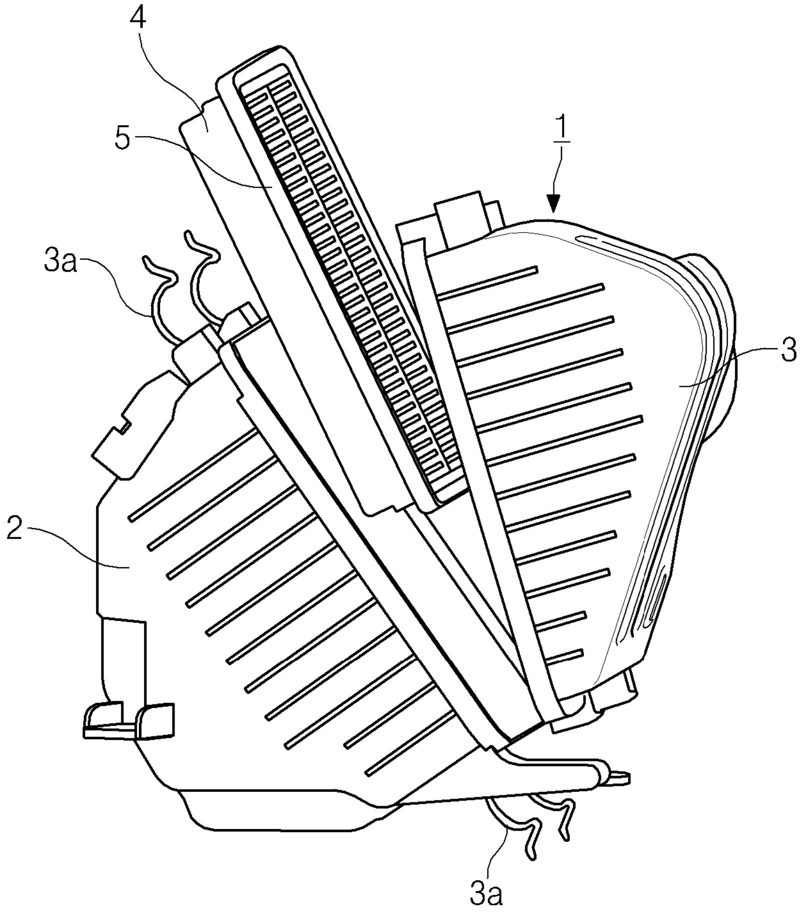
FIG. 2 is a view illustrating a filter replacement process in an air cleaner in the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, preferred embodiments of the present invention will be described with reference to the accompanying drawings.

FIGS. 3 and 4A to 4C are views illustrating an air cleaner and a filter replacement process according to an exemplary embodiment of the present invention.

Figure 3:
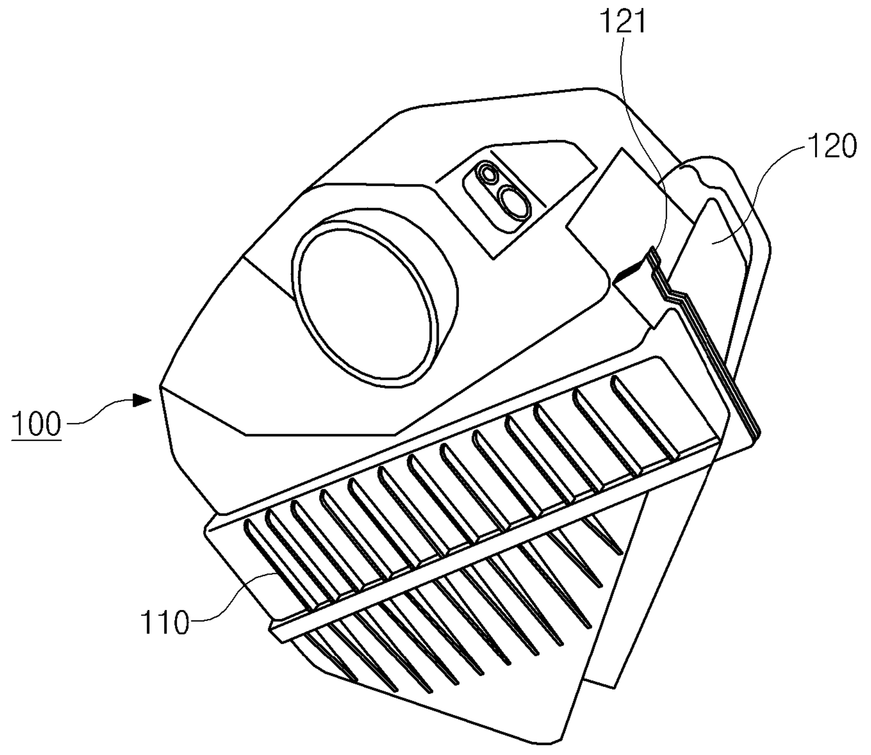
FIG. 3 is a view illustrating an air cleaner according to an exemplary embodiment of the present invention.

As illustrated in FIG. 3, an air cleaner 100 according to an exemplary embodiment of the present invention includes a case 110 accommodating a filter assembly 130, and a door 120 rotatably installed on one side of the case 110 to open and close an accommodation portion 111 of the case 110 in which the filter assembly 130 is inserted.

Figure 4A:
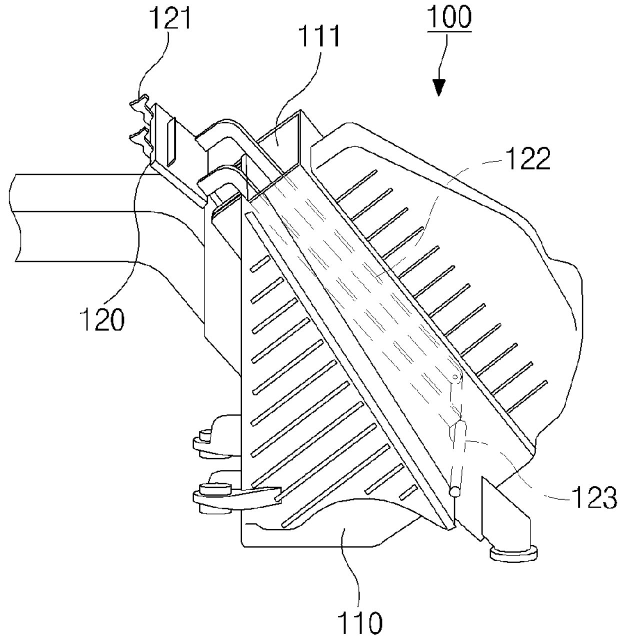
FIGS. 4A to 4C are views sequentially illustrating a filter replacement process in an air cleaner according to an exemplary embodiment of the present invention.
Figure 4B:
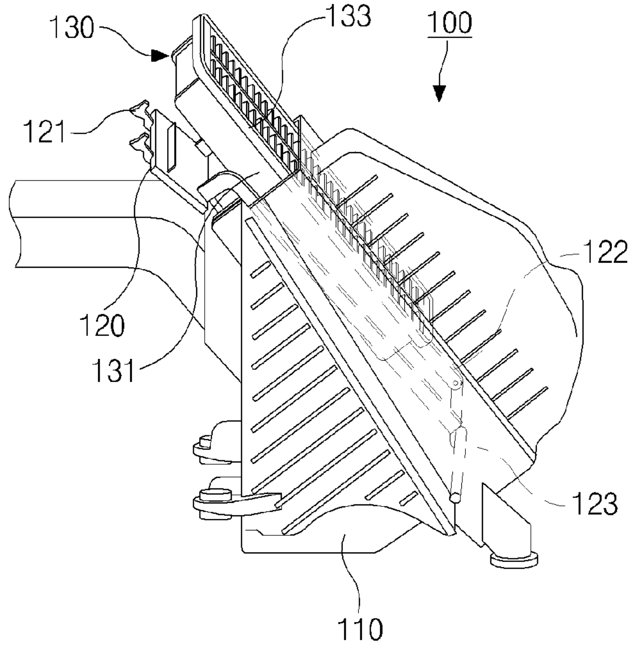
Figure 4C:
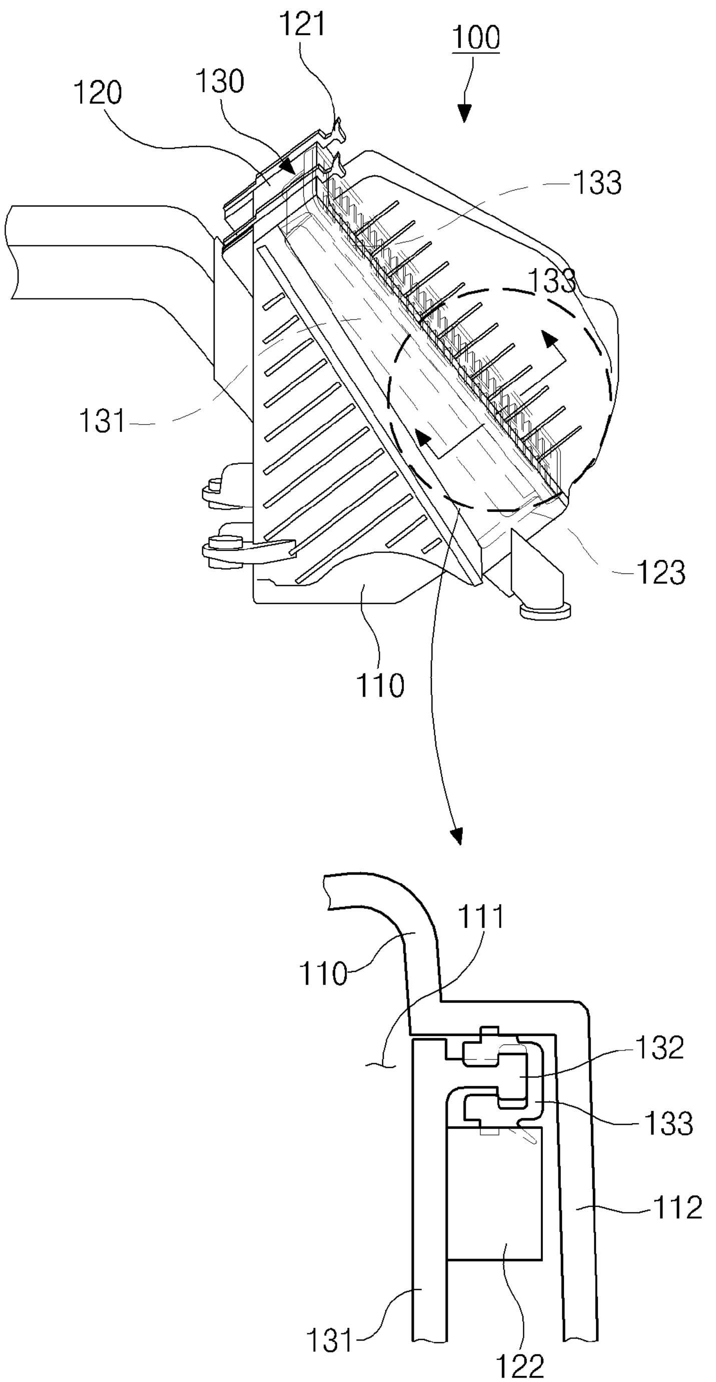

In the case 110, as illustrated in FIGS. 4A to 4C, the accommodation portion 111 for accommodating the filter assembly 130, that is, a filter frame 131 having a filter therein, in a sliding manner is formed, and on both sides of the accommodation portion 111, an outwardly projecting extension portion 112 is formed so that a link means to be described later and a gasket 133 of the filter frame 131 can be arranged thereon.

The door 120 is installed on the front surface of the accommodation portion 111 of the case 110 to open/close the accommodation portion 111. That is, a lower end portion of the door 120 is rotatably coupled to an outer surface of the case 110, and a hook-shaped clamp 121 that is hooked on and fixed to the case is formed on an upper end portion of the door 120.

A link means that interlocks when the door 120 is rotated is provided between the inner surface of the door 120 and the accommodation portion 111. The link means includes a plurality of vertical links 123 having lower end portions that are rotatably installed on the accommodation portion 111 of the case 110, and a horizontal link 122 having both end portions that are rotatably installed on the upper end portions of the vertical links 123 and the inner surface of the door 120, respectively. Accordingly, when the door 120 is rotated, the horizontal link 122 and the vertical links 123 simultaneously interlock with each other. In particular, when the door 120 is closed, the horizontal link 122 pushes up the filter frame 131, and the filter frame 131 adheres closely to the inner upper surface of the extension portion 112 of the case 110 to secure the airtightness of the filter assembly 130.

On the other hand, the filter assembly 130 includes the filter frame that accommodates the filter therein, and the filter frame 131 is inserted and accommodated in the accommodation portion 111 of the case 110 in a sliding manner. A coupling projection 132 that projects outwardly is formed along an outer periphery of the filter frame 131, and a rubber gasket 133 is installed to surround the coupling projection 132. In particular, the front end portion of the coupling projection 132 has an extended diameter to be hooked on an open end portion of the gasket 133, and thus the secession of the gasket 133 can be prevented. The coupling projection of the filter frame 131 and the gasket 133 are positioned in the extension portion 112 of the case 110, and the horizontal link 122 that interlocks when the door 120 is opened/closed becomes in contact with the lower surface of the gasket 133 to make the filter frame 131 ascend or descend.

A filter replacement process of the air cleaner according to an exemplary embodiment of the present invention as described above will be described.

First, as shown in FIG. 4C, the clamp 121 of the door 120 that closes the accommodation portion 111 of the case 110 is pressed to release the lock on the case 110, and then the door 120 is rotated to open the accommodation portion 111 of the case 110.

When the door 120 is rotated, the horizontal link 122 and the vertical links 123, which are provided in the accommodation portion 111 of the case 110, are rotated and moved to the inner lower portion of the accommodation portion 111 as shown in FIG. 4B.

In an exemplary embodiment of the present invention, the vertical link 123 rotates in the same direction as the door 120.

Due to the descending movement of the horizontal link 122, the filter frame 131 that is pressed and supported upwardly by the horizontal link 122 becomes free in the accommodation unit 111 of the case, and then the filter can be replaced through extraction of the filter frame 131 from the accommodation portion 111 in a sliding manner.

After the filter is replaced, the filter frame 131 is again inserted into the accommodation portion 111 of the case 110 that is empty as shown in FIG. 4A in a sliding manner, and then the accommodation portion 111 is closed through reverse rotation of the door 120 to be locked in the case through the clamp 121.

Then, by the rotation of the door 120, the horizontal link 122 and the vertical links 123, which are provided in the accommodation portion 111 of the case 110, are rotated reversely and are moved again to the inner upper portion of the accommodation portion 111. At the same time, the horizontal link 122 pushes up and supports the gasket 133 that surrounds the coupling projection 132 of the filter frame 131 onto the inner upper surface of the extension portion 112 of the case 110, as shown in the enlarged view of FIG. 4C, to secure the strong airtightness of the filter.

As described above, since the filter replacement from the case 110 is performed in a sliding manner, the repair performance and workability are improved.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An air cleaner apparatus for a vehicle, the apparatus comprising:
- a filter assembly;
- a case that accommodates the filter assembly therein;
- a door rotatably installed on the case to open/close the case; and
- a link unit having both end portions rotatably installed on the inside of the case and the door respectively, for making the filter assembly adhere closely to or release from the case while interlocking with the rotating door;
- wherein the link unit includes:
  - a vertical link having one end portion that is rotatably coupled to the inside of the case such that the vertical link is relatively rotatable with respect to the case; and
  - a horizontal link having both end portions that are rotatably coupled on the other end portion of the vertical link and the door respectively to make the filter assembly adhere closely to an inner surface of the case when the door is closed.

2. The air cleaner apparatus for the vehicle according to claim 1, wherein the horizontal link pushes the filter assembly upwards in the case when the door is closed while the vertical link rotates in the same direction as the door.

3. The air cleaner apparatus for the vehicle according to claim 1, wherein the filter assembly includes:
- a filter frame accommodating a filter therein;
- a coupling projection formed to project from an outer surface of the filter frame; and
- a gasket installed to surround the coupling projection to be selectively in contact with the inner surface of the case and the horizontal link.

4. The air cleaner apparatus for the vehicle according to claim 3, wherein the horizontal and vertical links are installed on one side of the case, and an extension portion to which the gasket of the filter assembly adheres closely is provided on the inner surface of the case.

* * * * *

UNITED STATES PATENT AND TRADEMARK OFFICE

CERTIFICATE OF CORRECTION

PATENT NO. : 8,784,527 B2
APPLICATION NO. : 13/449999
DATED : July 22, 2014
INVENTOR(S) : Doo Seok Jung It is certified that error appears in the above-identified patent and that said Letters Patent is hereby corrected as shown below:

On the Title Page

(75) Inventor:
After “Doo Seok Jung,” delete “Gyeonggi-do (KR)” and insert --Hwaseong-si (KR)--.

Signed and Sealed this
Thirtieth Day of September, 2014

Michelle K. Lee
*Deputy Director of the United States Patent and Trademark Office*